(12) United States Patent
Nishihara

(10) Patent No.: US 12,278,495 B1
(45) Date of Patent: Apr. 15, 2025

(54) NETWORKED SOLAR POWER GENERATION PLANT SYSTEM AND METHOD OF OPERATING THE SAME

(71) Applicant: SOLAR JAPAN Co., Ltd., Suzaka (JP)

(72) Inventor: Hidetsugu Nishihara, Suzaka (JP)

(73) Assignee: SOLAR JAPAN CO., LTD., Suzaka (JP)

( * ) Notice: Subject to any disclaimer, the term of this patent is extended or adjusted under 35 U.S.C. 154(b) by 0 days.

(21) Appl. No.: 18/865,326

(22) PCT Filed: Apr. 30, 2024

(86) PCT No.: PCT/JP2024/016639
§ 371 (c)(1),
(2) Date: Nov. 12, 2024

(87) PCT Pub. No.: WO2025/004523
PCT Pub. Date: Jan. 2, 2025

(30) Foreign Application Priority Data

Jun. 30, 2023   (JP) ................. 2023-107667

(51) Int. Cl.
*H02J 3/38* (2006.01)
*H02J 3/32* (2006.01)
*H02J 7/35* (2006.01)

(52) U.S. Cl.
CPC ............. *H02J 3/381* (2013.01); *H02J 3/32* (2013.01); *H02J 7/35* (2013.01); *H02J 2300/24* (2020.01)

(58) Field of Classification Search
CPC ...... H02J 3/381; H02J 3/32; H02J 7/35; H02J 2300/24
See application file for complete search history.

(56) References Cited

U.S. PATENT DOCUMENTS

| 2009/0288657 A1* | 11/2009 | Nishihara ............... F24S 80/54 |
| | | 126/634 |
| 2011/0133655 A1* | 6/2011 | Recker ................... H05B 45/12 |
| | | 315/159 |

(Continued)

FOREIGN PATENT DOCUMENTS

| JP | 2007-201257 A | 8/2007 |
| JP | 2011-155795 A | 8/2011 |

(Continued)

*Primary Examiner* — Ziaul Karim
(74) *Attorney, Agent, or Firm* — Muncy, Geissler, Olds & Lowe, P.C.

(57) ABSTRACT

In a networked solar power generation plant system, solar power generation plants are virtually integrated for accurately and suitably discharge-outputting electric power stored in the networked solar power generation plants, at optional time and in an optional amount, to a power transmission network. Solar power storage battery units are provided as terminal units, the networked solar power generation plant system is controlled by an external management computer, an information network is provided such that the external management computer is capable of accessing to identification informations of communication controllers, specific informations of the solar power storage battery units, power storage informations of the solar power storage battery units and electric power demand informations, and the external management computer controls each of the solar power storage battery units, so as to produce and control a discharge output plan of each of the solar power storage battery units.

6 Claims, 4 Drawing Sheets

(56) References Cited

U.S. PATENT DOCUMENTS

| | | | |
|---|---|---|---|
| 2013/0067253 A1* | 3/2013 | Tsuda | H02J 13/00028 |
| | | | 713/300 |
| 2014/0039714 A1* | 2/2014 | Watanabe | H02J 3/14 |
| | | | 700/295 |
| 2014/0042978 A1* | 2/2014 | Nishibayashi | H02J 13/00016 |
| | | | 320/134 |
| 2017/0207637 A1* | 7/2017 | Sugeno | H02J 7/0013 |
| 2017/0231053 A1* | 8/2017 | Underwood | F21S 8/086 |
| 2022/0013814 A1* | 1/2022 | Kirleis | B64C 39/04 |
| 2022/0045546 A1* | 2/2022 | Ikui | H02J 7/34 |

FOREIGN PATENT DOCUMENTS

| | | |
|---|---|---|
| JP | 2012-196122 A | 10/2012 |
| JP | 2013-042575 A | 2/2013 |
| JP | 2015-068690 A | 4/2015 |
| JP | 2017-060359 A | 3/2017 |
| JP | 2017-135920 A | 8/2017 |
| JP | 2018-098952 A | 6/2018 |
| JP | 3223017 U | 9/2019 |
| JP | 2020-010542 A | 1/2020 |
| JP | 2021-097558 A | 6/2021 |
| JP | 2021-136851 A | 9/2021 |
| JP | 2023-005861 A | 1/2023 |

* cited by examiner

NETWORKED SOLAR POWER GENERATION PLANT SYSTEM AND METHOD OF OPERATING THE SAME

FIELD OF THE INVENTION

The present invention relates to a networked solar power generation plant system and a method of operating said system, each of the solar power generation plants is constituted by a plurality of solar power storage battery units, which generate and store solar electric powers and act as terminal units connected to a power transmission network via a power conditioner and each of which comprises: power generation units for generating electric powers from solar light; a storage battery for automatically charging the electric powers generated by the power generation units therein; a communication controller for controlling discharge output of the storage battery by instructions sent from outside, and the solar power storage battery units are connected to an external management computer by the communication controllers and via a communication network, so that the plants are virtually integrated as a networked solar power generation plant, and they are managed by the external management computer.

BACKGROUND TECHNOLOGY

As shown in FIG. 5, in the conventional solar power generation plant 100, power generation units 20, in each of which a plurality of solar power generation panels 21 are serially connected, are provided, the power generation units 20 are parallelly connected to a power conditioner 40 and further connected to an electric power company 50.

Namely, as a basic structure of the solar power generation plant 100, the solar power generation panels 21 are serially connected to form one circuit of the power generation unit 20 and to adapt output voltage to an acceptable voltage of the power conditioner 40. Further, a plurality of circuits of the power generation units 20 are parallelly connected to the power conditioner 40 so as to form one power conditioner 40 system. Output power of the solar power generation plant 100 is sum of output powers of the power conditioners 40 which are parallelly connected.

A concrete example of the conventional solar power generation plant will be explained.

The general solar power generation panel 21 generates DC output whose normal power is 300 W, maximum output voltage is 40V, normal generation voltage is 30V and normal generation current is 10 A, the power generation unit 20 is constituted by seven solar power generation panels 21, which are serially connected and whose maximum output voltage is 280V, normal generation voltage is 210V, normal generation current is 10 A and a system output power is 2100 W (2.1 kW), and connected to the power conditioner 40. Note that, most of small-scale solar power generation plants and large-scale solar power generation plants have the above-described basic structure as standardized structure. Number of the power generation unit systems connected to the power conditioner 40 is adjusted according to the output power of the power generation unit 20. For example, in case of the power conditioner 40 whose output power is 5 kW, three solar power generation panel systems (the power generation units 20) of 2.1 kW are parallelly connected. In case of output power of 50 kW, 30 systems are connected; in case of a mega solar generation plant of 1000 kW, 600 systems are connected. The power conditioner 40 is capable of automatically generating AC electric power in proportion to DC electric power inputted from the solar power generation panel systems.

A solar power charging/discharging device is disclosed (see Patent Document 1) as a household solar power storage unit comprising: DC input terminals connected to solar power generation panels; DC output terminals connected to a power converter (a unit for converting a DC electric source into a commercial AC electric source); connection terminals to which signal lines of an electric power sensor are connected; and a control panel, which includes control circuits for controlling storage of electric powers in storage batteries and controlling DC output powers sent to the power converter on the basis of signals from the electric power sensor, being fixed to an exterior of the storage battery, wherein connection terminals of the control panel and the storage batteries are connected and integrated. With this device, a surplus electric power of the solar power generation can be stored, the stored electric power can be consumed by a home, and electricity bill of the home can be highly reduced.

A network system of solar battery charging units is disclosed (see Patent Document 2), and it comprises: a plurality of solar battery charging units, each of which includes a solar battery module installed on a building, a storage battery for storing electric power generated by the solar battery module, and a charging unit for charging an electric power to an electric vehicle; and a management device which is mutually communicably connected to the solar battery charging units via internet. With this network system of solar battery charging units, charging stands using solar power generation can be spread widely, and electric vehicles can be charged even at places of visit.

PRIOR ART DOCUMENT

Patent Literature

Patent Document 1: Japanese Registered Utility Model No. 3223017 (Page 1)
Patent Document 2: Japanese Laid-open Patent Publication No. 2021-97558 (Page 1)

SUMMARY OF THE INVENTION

Problems to be Solved by the Invention

Japanese FIT program (Feed-in Tariff Program for Renewable Energy) has started from 2012, all of solar electric powers are generated and sold to electric power companies at the same time, so generation amounts of the solar electric powers are increased with spreading the solar power generation, and there are social problems that the power generation amounts of the solar electric powers during the daytime become excessive and that the amounts become insufficient during evening and night. These days, solar power plants are required to be able to stop generating electricity during the daytime in order to prevent excess electricity, and power generation is stopped by installing a power generation stopping device. Thus, electric power companies incur economic losses due to the loss of generated energy during stoppage of power generation, and there is a social problem that electric power shortages occur in hours other than daytime hours when excess electricity is generated.

An object of the present invention is to provide a networked solar power generation plant system, in which solar power generation plants are virtually integrated and which is capable of accurately and suitably discharge-outputting electric powers stored in the networked solar power generation plants, at optional time and in an optional amount, to the power transmission network without stopping solar power generation, and a method of operating said system.

Means for Solving the Problems

To achieve the object, the present invention has following structures.

An embodiment is a networked solar power generation plant system comprising: a plurality of solar power generation plants; and a power transmission network, wherein each of the solar power generation plants is constituted by a plurality of solar power storage battery units, which generate and store solar electric powers and act as terminal units connected to the power transmission network via a power conditioner and each of which comprises: a power generation unit for generating electric power from solar light; a storage battery for automatically charging the electric power generated by the power generation unit therein; a communication controller for controlling discharge output of the storage batteries on the basis of instructions from outside, wherein the solar power storage battery units are connected to an external management computer, by the communication controllers, via a communication network apart from a network for connecting to an electric power company through examined wattmeters such that the solar power storage battery units are virtually integrated as the networked solar power generation plant and can be managed by the external management computer, wherein the external management computer accesses to operating informations through an information network, the operating informations include: identification informations for identifying each of the solar power storage battery units, the identification informations being given to the communication controllers; specific informations of the solar power storage battery units including at least installation locations, the specific informations being linked to associate with the identification informations; power storage informations of the solar power storage battery units including at least power storage amounts, the power storage informations being linked to associate with the identification informations, the power storage informations being variation informations; and an electric power demand informations being an external information relating to electric power demand, the electric power demand informations being variation informations, and wherein the external management computer produces a discharge output plan for each of the solar power storage battery units, on the basis of the identification informations, the specific informations, the power storage informations and the electric power demand informations, and controls discharge output of each of the solar power storage battery units such that electric powers stored in the networked solar power generation plants can be discharge-outputted, at optional time and in an optional amount, to the power transmission network.

In the embodiment of the networked solar power generation plant system, wherein each of the power storage informations may include the power storage amount which is estimated from measured voltage of the storage battery.

In the embodiment of the networked solar power generation plant system, each of the solar power storage battery units may comprise: the power generation unit; the storage battery for charging electric power generated by the power generation unit through a charge circuit and discharging the same through a discharge circuit; means for obtaining an electric power storage information being connected to the storage battery; and the communication controller for receiving instructions from the external management computer and controlling the discharge circuit so as to transmit the electric power storage information to outside and control the discharge output of the storage battery, and a storage battery unit may be constituted by unitizing the storage battery, the charge circuit, the discharge circuit, the obtaining means and the communication controller, and the storage battery unit may be connected between the power generation unit and the power conditioner.

In the embodiment of the networked solar power generation plant system, the information network may be provided such that the external management computer is capable of accessing to informations of amounts of output powers, which can be obtained by measuring output voltages and output currents of the storage batteries, with time, as an information of discharge output of each of the solar power storage battery units.

Another embodiment is a method of operating the networked solar power generation plant system with using the external management computer, comprising: a step of obtaining the power storage amount from the power storage information of each of the solar power storage battery units by the external management computer; a step of obtaining the amount of electric power demand, which is estimated from the electric power demand informations, by the external management computer; a step of producing the discharge output plan for each of the solar power storage battery units, on the basis of the identification information, the specific information, the power storage information and the electric power demand information, by the external management computer, as an electric power supply plan for supplying electric power from the solar power generation plant network to the power transmission network; and a step of performing discharge output of each of the solar power storage battery units by instructions of the external management computer on the basis of the discharge output plan.

The embodiment of the method may further comprise a step of grasping an operating condition of each of the solar power storage battery units by collating an information of an estimated amount of output electric power, which is estimated from the discharge output plan of each of the solar power storage battery units, with an information of an amount of output electric power discharge-outputted to the power transmission network, which is obtained by measuring the output voltage and the output current of the storage battery with time and which is controlled by controlling discharge output of each of the solar power storage battery units, by the external management computer, and correcting the discharge output plan and the control of each of the solar power storage battery units by the external management computer.

The embodiment of the method may further comprise a step of grasping an operating condition of each of the solar power generation plants by collating an information of an amount of electric power supply, which is supplied from the solar power generation plants to the power transmission network and which is obtained by measuring by the examined wattmeter provided to each of the solar power generation plants, with an information of an estimated amount of electric power supply, which is obtained by integrating the information data of the amount of electric power supply from each of the solar power storage battery units, by the external management computer, and correcting the discharge output plan and the control of each of the solar power storage battery units by the external management computer.

Effects of the Invention

The networked solar power generation plant system and the operating method of the present invention have the advantageous effect that the solar power generation plants are virtually integrated and capable of accurately and suitably discharge-outputting electric powers stored in the networked solar power generation plants, at optional time and in an optional amount, to the power transmission network without stopping solar power generation.

EMBODIMENTS OF THE INVENTION

Figure 1:
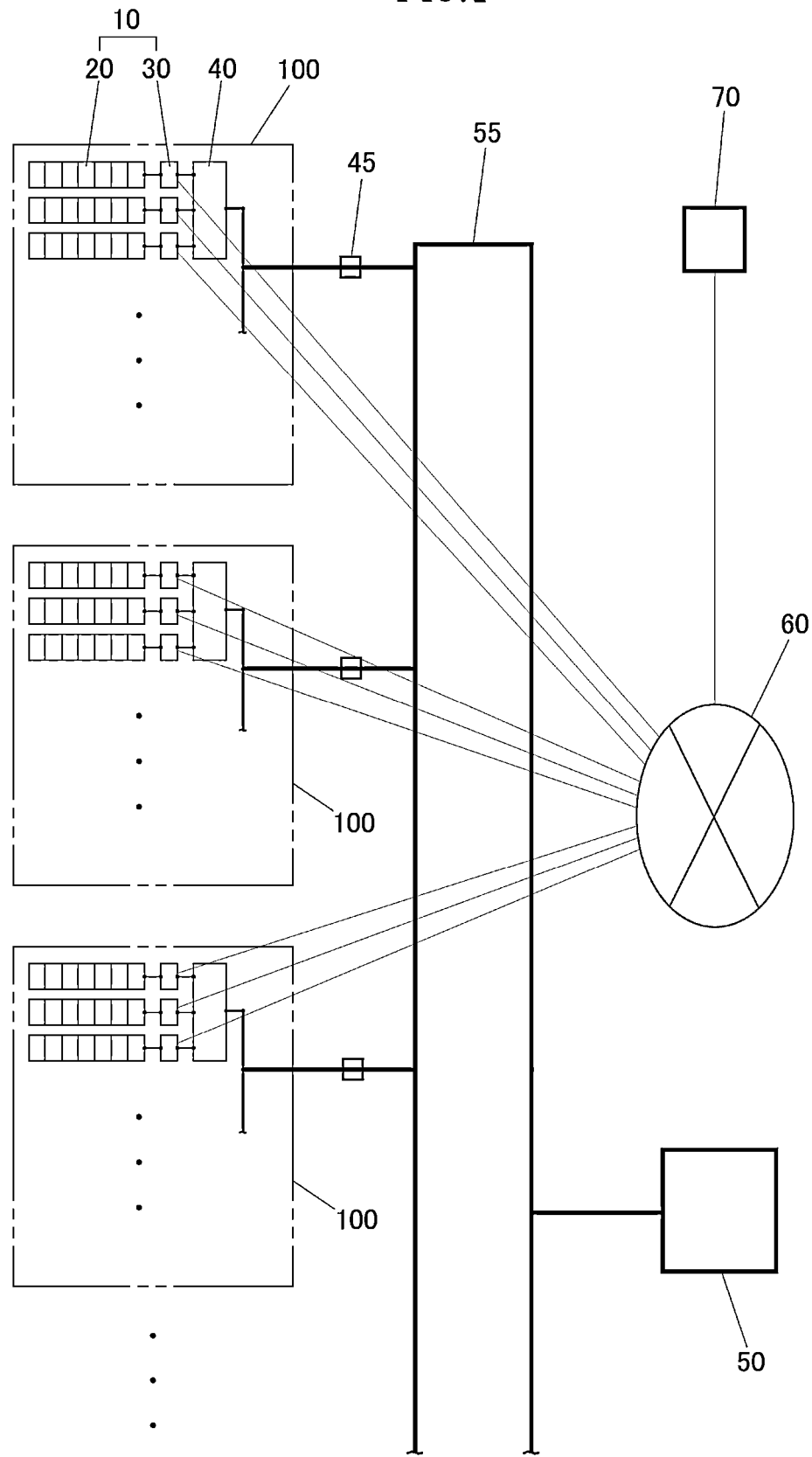
FIG. 1 is a diagram of an embodiment of the networked solar power generation plant system relating to the present invention.

Embodiments of the networked solar power generation plant system relating to the present invention and the method of operating the same will now be described in detail with reference to the accompanying drawings (FIGS. 1-4).

As shown in FIGS. 1-4, the networked solar power generation plant system relating to the present invention comprises a plurality of solar power generation plants 100, each of which is constituted by a plurality of solar power storage battery units 10 for generating and storing solar electric powers and acting as terminal units connected to a power transmission network 55 via power conditioners 40, and each of the solar power storage battery units comprises: power generation units 20 for generating electric powers from solar light; a storage battery 31 (see FIG. 4) for automatically charging the electric powers generated by the power generation units 20 therein; and a communication controller 35 (see FIG. 4) for controlling discharge output of the storage battery 31 on the basis of instructions from outside.

The solar power storage battery units 10 are connected to an external management computer 70 by the communication controllers 35 via a communication network (e.g., internet 60) apart from a network for connecting to an electric power company through examined wattmeters such that the solar power storage battery units are virtually integrated as the networked solar power generation plants and can be managed by the external management computer 70.

Further, in the networked solar power generation plant system relating to the present invention, an arithmetic unit of the external management computer 70, etc. accesses to and processes operating informations through an information network, the operating informations include: identification informations for identifying the solar power storage battery units 10, the identification informations being respectively given to the communication controllers 35; specific informations of the solar power storage battery units 10 including at least installation locations, the specific informations being linked to associate with the identification informations; power storage informations of the solar power storage battery units 10 including at least power storage amounts, the power storage informations being linked to associate with each of the identification informations, the power storage informations being variation informations; and electric power demand informations being external informations relating to electric power demand, the electric power demand informations being variation informations.

In the networked solar power generation plant system of the present invention, the external management computer 70 produces a discharge output plan for each of the solar power storage battery units 10, on the basis of the identification informations, the specific informations, the power storage informations and the electric power demand informations, and controls discharge output of each of the solar power storage battery units 10 such that electric powers stored in the networked solar power generation plants can be discharge-outputted, at optional time and in an optional amount, to the power transmission network 55. Note that, the information processing of the present invention may be, off course, performed by cloud computing, distributed processing (with a plurality of servers), etc.

With the above-described structure, the networked solar power generation plants, which are virtually integrated, can be rationally managed, solar powers can be used without being wasted and without stopping the solar power generation plants 100, so that the networked solar power generation plant system has an advantageous effect of accurately and suitably discharge-outputting electric powers stored in the networked solar power generation plants, at optional time and in an optional amount, to the power transmission network. The solar power storage battery units 10 are respectively managed, so that degradations of a power generation performance and a battery storage performance and equipment failures can be grasped by minimum units, and so that problems can be found and dealt without stopping the entire solar power generation plants 100.

Note that, in the present invention, the identification informations are identification means being managed by the external management computer 70, such as identification codes, e.g., identification numbers, combinations of figures, symbols.

In the present invention, the specific informations are fixed informations such as installation location informations, specific informations of the solar power generation panels 21 (configurations of power generation devices constituting the power generation units 20) and the storage batteries 31, which will deteriorate with laps of time, etc.

In the present invention, the power storage informations may include variable informations of each of the solar power storage battery units 10 used for grasping power storage conditions thereof, such as the power storage amount informations, which are estimated from measured voltages of the storage batteries 31, power storage amount informations, which are respectively estimated for each area (for each of the solar power generation plants 100) under weather conditions, etc.

Further, the electric power demand informations may include variation informations, e.g., market prices of electric powers other than FIT prices decided by JEPX (Japan Electric Power Exchange), local demand forecasting varied in each area by weather conditions.

These informations can be used for, for example, deciding priority of discharge output of the solar power storage battery units 10, selecting or excluding the solar power storage battery units 10 whose discharge outputs are performed at specific times or in specific areas. For example, electric power can be controlled to discharge, with priority, from the solar power storage battery units 10 close to an area where electric power demand is high, the solar power storage battery units 10 storing high electric powers are controlled to discharge with priority, etc., so that the networked solar power generation plant system can be optimally operated.

In the present embodiment, the external management computer 70 is capable of accessing to an information of amount of output electric power, which is an information of discharge output of each of the solar power storage battery units 10 obtained by measuring output voltage and output current of the storage battery 31 with time, through the information network. With this structure, as described later, operating conditions of the networked solar power generation plant system can be suitably grasped and suitably corrected, so that the network system can be optimally operated.

Next, an embodiment of the method of operating the networked solar power generation plant system will be explained with reference to FIG. 2. In this method, the networked solar power generation plant system is controlled and operated by the external management computer 70, and the method comprises: a step of obtaining the power storage amount (Step 1); a step of obtaining the amount of electric power demand (Step 2); a step of producing the discharge output plan (Step 3); a step of performing discharge output (Step 4); and a step of collating output powers. The step of collating output powers may include: a step of collating a plan information of an amount of output electric power of each of the solar power storage battery units 10 with an information of an amount of output electric power of each of the solar power storage battery units 10 (Step 5); and a step of collating an information of an estimated amount of electric power supply of the solar power generation plant 100, which is obtained by integrating the information of the amount of output electric power supply of each of the solar power storage battery units 10, with an information of an amount of electric power supply, which is measured by the examined wattmeter 45 provided to each of the solar power generation plant 100 (Step 6).

In the step of obtaining the power storage amount (Step 1), the external management computer 70 obtains the power storage amount from the power storage information of each of the solar power storage battery units 10. With this manner, the power storage amount of the entire networked solar power generation plants, and the power storage amount of each of the solar power storage battery units 10, which is a terminal unit for generating and storing solar power, can be obtained, so that the network system can be managed to highly effectively supply electric powers to the power transmission network 55. For example, the external management computer 70 is capable of obtaining (monitoring) the power storage amount from data (e.g., voltage data, current data) intermittently generated by (transmitted from) the communication controllers 35.

In the step of obtaining the amount of electric power demand (Step 2), the external management computer 70 obtains an estimated amount of electric power demand, which is estimated from, for example, an electric power demand informations of JEPX (Japan Electric Power Exchange). Thus, in case that electric power demand is greater than stored electric power, all of the solar power storage battery units 10 discharge-output so as to supply the stored electric powers of the entire networked solar power generation plants to the power transmission network 55. On the other hand, in case that electric power demand is less than the stored electric power, for example, priority of discharge output of each of the solar power storage battery units 10 may be decided and managed as described above.

In the step of producing the discharge output plan (Step 3), the external management computer 70 produces the discharge output plan of each of the solar power storage battery units 10, as an electric power supply plan from the networked solar power generation plants to the power transmission network 55, on the basis of the identification informations, the specific informations, the power storage informations and the electric power demand informations. With this manner, an accurate and optimum discharge output plan can be produced.

In the step of performing discharge output (Step 4), the external management computer 70 controls each of the solar power storage battery units 10 to perform discharge output on the basis of the discharge output plan. With this manner, the electric power stored in the networked solar power generation plants can be accurately and optimally discharge-outputted to the power transmission network at optional time and in an optional amount.

Figure 2:
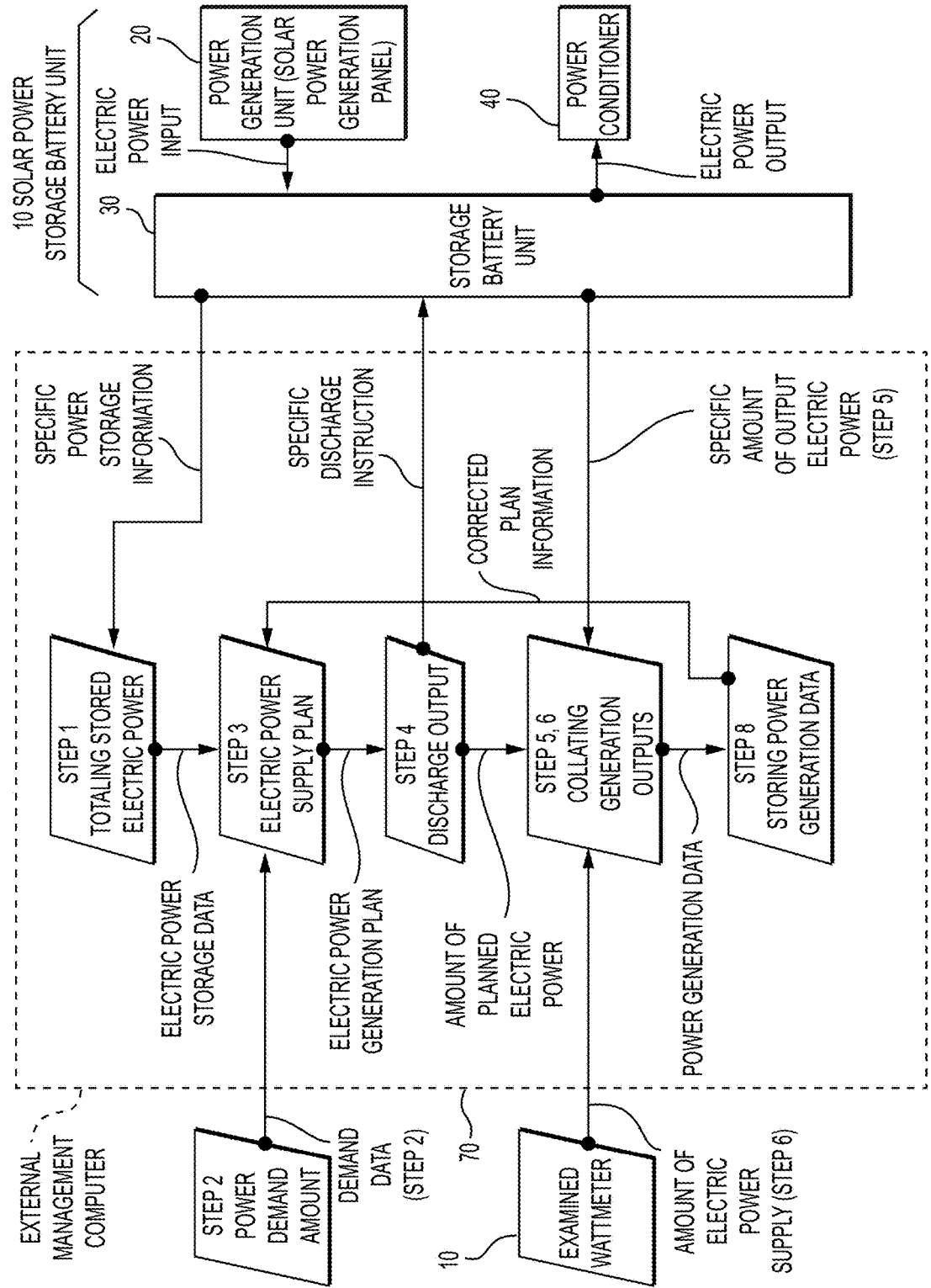
FIG. 2 is an explanation diagram of an operation example of the networked solar power generation plant system relating to the present invention.

In the present embodiment, the step of grasping the operating condition of each of the solar power storage battery units 10 may include: collating the information of the estimated amount of output electric power, which is estimated from the discharge output plan of each of the solar power storage battery units 10, with the information of the amount of output electric power discharge-outputted to the power transmission network 55, which is the information obtained by measuring the output voltages and the output currents of the storage batteries 31 and used for controlling discharge output of each of the solar power storage battery units 10, by the external management computer 70; and correcting the discharge output plan and the control of each of the solar power storage battery units 10 by the external management computer 70 (Step 5) as shown in FIG. 2. With this manner, the control of discharge-outputting the electric power stored in the networked solar power generation plants to the power transmission network 55, at optional time and in an optional amount, can be feedbacked (Step 7), so that the management of each of the solar power generation plants 100 and each of the solar power storage battery units 10 can be highly accurately and optimally performed.

Further, in the present embodiment, the step of grasping the operating condition of each of the solar power generation plant 100 may include: collating the information of the supply amount of electric power, which is supplied from the solar power generation plant 100 to the power transmission network 55 and which is obtained by measuring with the examined wattmeter 45 provided to each of the solar power generation plants 100 and sent to the external management computer 70 through the network of the electric power company, with the information of the estimated supply amount of electric power, which is obtained by integrating the information of the supply amount of electric power of each of the solar power storage battery units 10, by the external management computer 70; and correcting the discharge output plan and the control of each of the solar power storage battery units 10 by the external management computer 70 (Step 6) as shown in FIG. 2. With this manner too, the control of discharge-outputting the electric power stored in the networked solar power generation plants 100 to the power transmission network 55, at optional time and in an optional amount, can be feedbacked (Step 7), so that the management of each of the solar power generation plants 100 and each of the solar power storage battery units 10 can be highly accurately and optimally performed.

Further, in the present embodiment, a step of storing the data of generating electric power collated in Step 5 and Step 6 may be included as shown in FIG. 2 (Step 8). The stored data may be used for AI-learning. Informations obtained by the AI-learning can be used for highly accurately and optimally operating each of the solar power generation plants 100 and the networked solar power generation plants.

Figure 3:
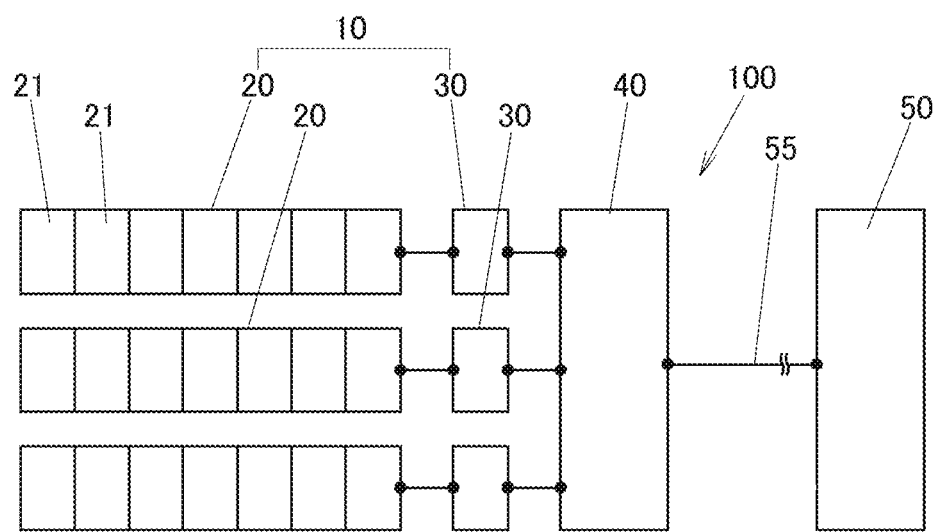
FIG. 3 is a connection diagram of the solar power generation plant shown in FIG. 1.

In the solar power generation plant 100 of an embodiment shown in FIG. 3, a storage unit 30 including the communication controller 35 and the storage battery 31 (see FIG. 4) is provided between each of the power generation units 20 and the power conditioner 40, so that each of the solar power storage battery unit 10 is constituted by the power generation unit 20 and the storage unit 30. By using the storage units 30, the external management computer 70 is capable of managing to charge the electric power generated by the power generation units 20 and optionally discharging the stored electric power to the power conditioner 40 (see FIG. 2). The storage units 30 may be simply connected to the power generation units 20 and the power conditioner 40, and electric powers for actuating the storage units 30 (the communication controllers 35, etc.) can be supplied from the power generation units 20.

A concrete structural example of the solar power generation plant 100 will be explained with reference to FIG. 3, each of the power generation circuits (the power generation units 20) is constituted by seven solar power generation panels 21, each of whose output power is 300 W and whose total output power is 2.1 kW, output voltage is DC 280V and output current is DC 7.5 A. Three circuits of the power generation units 20 are parallelly connected to the power conditioner 40, so that a power conditioner system of 5 kW can be formed. The storage units 30 are respectively connected to the power generation units 20 of the three circuits. Note that, each of the storage units 30 may have the storage battery 31 of 100 kWh (see FIG. 4) such that most of electric powers generated during the daytime can be charged.

Figure 4:
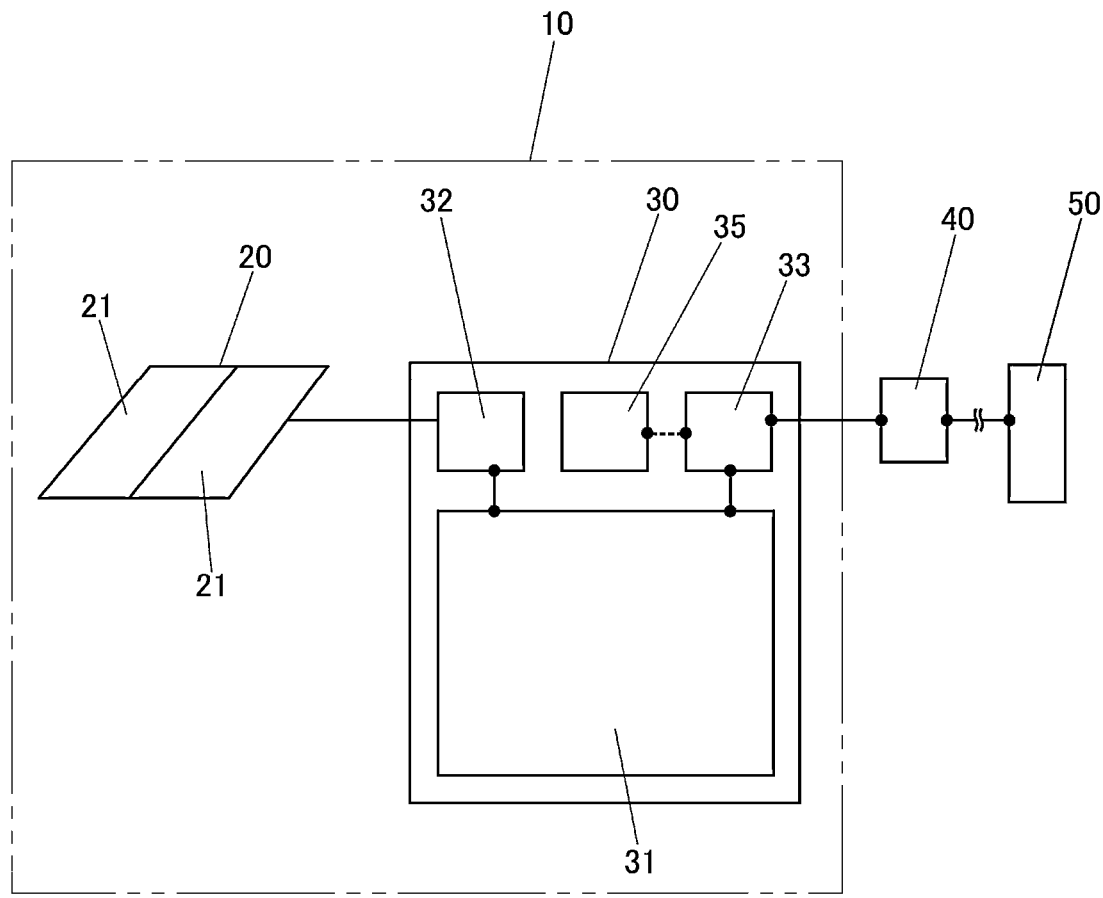
FIG. 4 is a connection diagram of a storage battery unit shown in FIG. 1.
Figure 5:
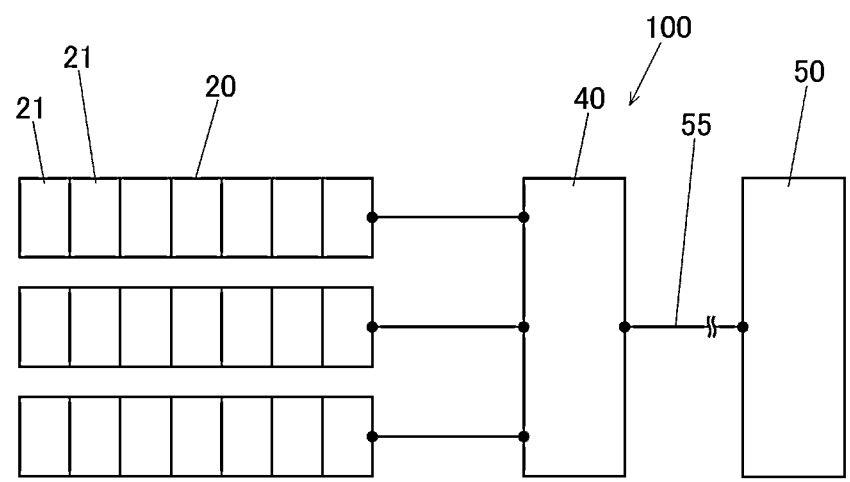
FIG. 5 is a connection diagram of the conventional solar power generation plant.

The storage unit 30 of an embodiment shown in FIG. 4 comprises: a charging circuit 32; the storage battery 31 to which all amount of electric power generated in the power generation unit 20 is automatically charged by the charging circuit 32; a discharging circuit 33 for discharging the electric power stored in the storage battery 31 to the power conditioner 40; and the communication controller 35 for remote-controlling the discharging circuit 33. A voltmeter (not shown), which measures voltage to obtain the amount of stored electric power, and an ammeter (not shown), which measures the output current to calculate the amount of electric power from the output voltage measured by the voltmeter and the output current, are connected to the storage battery 31, and the communication controller 35 is further connected so as to send the informations, e.g., the voltage relating to the amount of stored electric power, the output voltage, the output current, to the external management computer 70. Namely, in the embodiment shown in FIG. 4, the solar power storage battery unit 10 comprises: the power generation unit 20; the storage battery 31 to which the electric power generated by the power generation unit 20 is charged through the charging circuit 32 and from which the electric power is discharged through the discharging circuit 33; means for obtaining the electric power storage information being connected to the storage battery 31; and the communication controller 35 capable of sending the electric power storage information to outside and receiving instructions from the external management computer 70 so as to control the discharging circuit 33 and control the discharge output of the storage battery 31, and the storage battery 31, the charging circuit 32, the discharging circuit 33, the means for obtaining the electric power storage information and the communication controller 35 are unitized, so that the storage unit 30, which is connected between the power generation unit 20 and the power conditioner 40, is constituted. Note that, the means for obtaining the electric power storage information is constituted by, for example, the described voltmeter and ammeter.

By the above-described structure, all of the solar electric powers can be stored in the storage battery 31, so an approximate amount of storing electric powers for a day can be grasped, depending on the seasons, around 3:00 pm. For example, in case that an amount of electric power demand is increased from around 5:00 pm, opposing to reduction of the amount of generating solar powers, the networked solar power generation plant system is capable of freely discharging electric powers, at required time and in a required amount, by respectively controlling a plurality of (a large number of) selected solar power storage battery units 10. With this manner, the solar power generation plants need not be stopped so as to prevent generation of surplus electric powers, so that solar energy can be effectively used. Note that, in the present embodiment, the solar power generation system capable of selling all of the generated electric powers is assumed, but the plants may consume electric powers for actuating the system, and the generated electric powers, off course, may be freely used. Further, in the present embodiment, all of the generated electric powers are charged in the storage batteries 31 but not limited thereto, and another circuit for directly sending a part or all of the generated electric powers, depending on time periods, to the power conditioner 40 and supplying them to the power transmission network 55 may be added.

A large number of the solar power storage battery units 10, which are constituted by the power generation units 20 and the storage units 30, are installed, the solar power storage battery units 10 can be mass-produced at low cost, so that facility costs (initial costs) of the networked solar power generation plant system can be reduced. Further, the storage units 30 are respectively provided to the power generation units 20 and can be dispersively installed, so that there is an effect that no space is required. Namely, the storage units 30 may be accommodated in, for example, durable and waterproof cases, so that they can be dispersively installed outside and respectively corresponded to the power generation units 20.

Many manufacturers who manufacture the power generation units 20 (e.g., the solar power generation panels 21) and the power conditioners 40 exist, but a basic specification of the power generation circuits are the same. Therefore, in case that the storage units 30 are attached to the installed power generation units 20 later, the storage units 30 can be standardized and easily installed in the existing solar power generation plants 100. Therefore, the storage units 30 can be mass-produced, and production costs thereof can be reduced.

The information network of the present embodiment may be, for example, the internet 60, and wireless LANs (Local Area Network) may be used in the solar power generation plants 100. By using widely used Wi-Fis as the wireless LAN, the information network can be easily constructed at low cost. Note that, mobile phone networks, Bluetooth, etc. may be used, other than the above-described means, as communication means.

The present invention relates to the solar power generation plant system, but the system of the present invention may be, off course, applied to other power generation systems, e.g., natural energy power generation plants using wind power, water power, etc. Further, an additional control/management system may be added so as to charge/discharge surplus electric powers of the commercial electric powers, which are generated in baseload electric sources, to/from the storage batteries 31 in accordance with the estimated electric power demand.

The preferred embodiments of the present invention have been described, but the present invention is not limited to the above embodiments, and many alternations could be made hereto without departing from the spirit of the invention.

EXPLANATION OF REFERENCE SYMBOLS

10 SOLAR POWER STORAGE BATTERY UNIT
20 POWER GENERATION UNIT
21 SOLAR POWER GENERATION PANEL
30 STORAGE BATTERY UNIT
31 STORAGE BATTERY
32 CHARGING CIRCUIT
33 DISCHARGING CIRCUIT
35 COMMULNICATION CONTROLLER
40 POWER CONDITIONER
45 EXAMINED WATTMETER
50 ELECTRIC POWER COMPANY
55 POWER TRANSMISSION NETWORK
60 INTERNET
70 EXTERNAL MANAGEMENT COMPUTER
100 SOLAR POWER GENERATION PLANT

The invention claimed is:

1. A networked solar power generation plant system comprising: a plurality of solar power generation plants; and a power transmission network,
wherein each of the solar power generation plants is constituted by a plurality of solar power storage battery units, which generate and store solar electric powers and act as terminal units connected to the power transmission network via a power conditioner and each of which comprises: a power generation unit for generating electric power from solar light; a storage battery for automatically charging the electric power generated by the power generation unit therein; a communication controller for controlling discharge output of the storage batteries on the basis of instructions from outside,
wherein the solar power storage battery units are connected to an external management computer, by the communication controllers, via a communication network apart from a network for connecting to an electric power company through examined wattmeters such that the solar power storage battery units are virtually integrated as the networked solar power generation plant and are can be managed by the external management computer,
wherein the external management computer accesses to operating informations through an information network, the operating informations include:
identification informations for identifying each of the solar power storage battery units, the identification informations being given to the communication controllers;
specific informations of the solar power storage battery units including at least installation locations, the specific informations being linked to associate with the identification informations;
power storage informations of the solar power storage battery units including at least power storage amounts, the power storage informations being linked to associate with the identification informations, the power storage informations being variation informations; and
electric power demand informations being external informations relating to electric power demands, the electric power demand informations being variation informations,
wherein the external management computer produces a discharge output plan for each of the solar power storage battery units, on the basis of the identification informations, the specific informations, the power storage informations and the electric power demand informations, and controls discharge output of each of the solar power storage battery units such that electric powers stored in the networked solar power generation plants can be discharge-outputted, at optional time and in an optional amount, to the power transmission network, and
wherein the information network is provided such that the external management computer accesses informations of amounts of output powers, which are obtained by measuring output voltages and output currents of the storage batteries, with time, as an information of discharge output of each of the solar power storage battery units.

2. The networked solar power generation plant system according to claim 1, wherein each of the power storage informations includes the power storage amount which is estimated from measured voltage of the storage battery.

3. A method of operating the networked solar power generation plant system according to claim 1 with using the external management computer, the method comprising:
obtaining the power storage amount from the power storage information of each of the solar power storage battery units by the external management computer;
obtaining the amount of electric power demand, which is estimated from the electric power demand informations, by the external management computer;
producing the discharge output plan for each of the solar power storage battery units, on the basis of the identification information, the specific information, the power storage information and the electric power demand information, by the external management computer, as an electric power supply plan for supplying electric powers from the solar power generation plant network to the power transmission network; and
performing discharge output of each of the solar power storage battery units by instructions of the external management computer on the basis of the discharge output plan.

4. The method according to claim 3, further comprising a step of grasping an operating condition of each of the solar power storage battery units by collating an information of an estimated amount of output electric power, which is estimated from the discharge output plan of each of the solar power storage battery units, with an information of an amount of output electric power discharge-outputted to the power transmission network, which is obtained by measuring the output voltage and the output current of the storage battery with time and which is controlled by controlling discharge output of each of the solar power storage battery units, by the external management computer, and correcting the discharge output plan and the control of each of the solar power storage battery units by the external management computer.

5. The method according to claim 4, further comprising: a step of grasping an operating condition of each of the solar power generation plants by collating an information of an amount of electric power supply, which is supplied from the solar power generation plants to the power transmission network and which is obtained by measuring by the examined wattmeter provided to each of the solar power generation plants, with an information of an estimated amount of electric power supply, which is obtained by integrating the information data of the amount of electric power supply from each of the solar power storage battery units, by the external management computer, and correcting the discharge output plan and the control of each of the solar power storage battery units by the external management computer.

6. The networked solar power generation plant system according to claim 1, wherein each of the solar power storage battery units comprises:

the power generation unit;

the storage battery for charging electric power generated by the power generation unit through a charge circuit and discharging the same through a discharge circuit;

obtaining an electric power storage information being connected to the storage battery; and the communication controller for receiving instructions from the external management computer and controlling the discharge circuit so as to transmit the electric power storage information to outside and control the discharge output of the storage battery, and wherein a storage battery unit is constituted by unitizing the storage battery, the charge circuit, the discharge circuit, the obtaining and the communication controller, and the storage battery unit is connected between the power generation unit and the power conditioner.

* * * * *